United States Patent Office 3,141,041
Patented July 14, 1964

3,141,041
PREPARATION OF SUBSTITUTED ACETAMIDES
Harold M. Taylor, Indianapolis, Ind., assignor to Eli Lilly and Company, Indianapolis, Ind., a corporation of Indiana
No Drawing. Filed June 6, 1962, Ser. No. 200,309
9 Claims. (Cl. 260—558)

This invention relates to a process for the preparation of hydrocarbon-substituted acetamides. More particularly, this invention is concerned with the preparation of herbicidally active N,N-dialkyldihydrocarbylacetamides, such as N,N-dimethyldiphenylacetamide, from cheap, readily available raw materials.

Exemplary of the manner in which N,N-dialkyldihydrocarbylacetamides are presently produced is the preparation of N,N-dimethyldiphenylacetamide. The reaction is as follows:

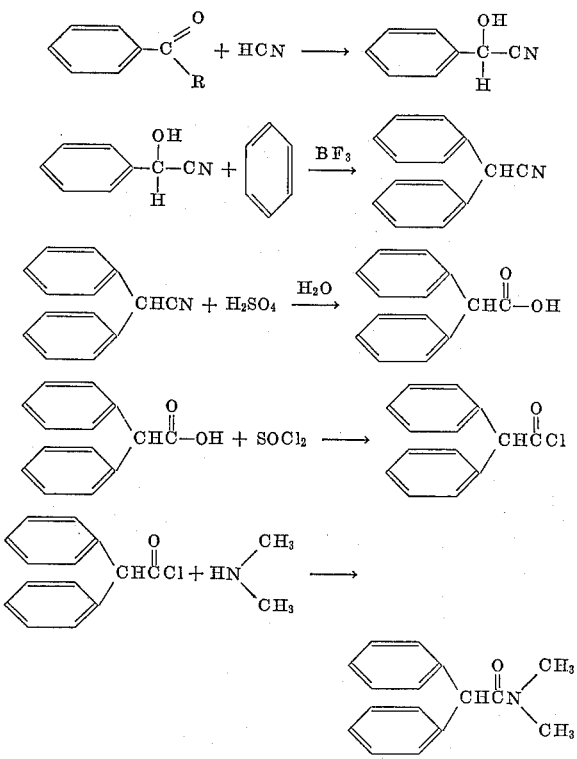

This process is expensive, both from the raw materials standpoint and from the many processing steps involved. Furthermore, the process requires expensive equipment and elaborate handling techniques because of the highly dangerous boron trifluoride and hydrogen cyanide utilized therein.

Because of the importance of a low-cost manufacturing process to the commercial success of an agricultural chemical, a process such as that set forth above presents an inherent disadvantage to the successful marketing of a new agricultural chemical entity—a disadvantage which could well result in a product having a prohibitive consumer price. Therefore, owing to the agricultural significance of N,N-dialkyldihydrocarbylacetamides, such as N,N-dimethyldiphenylacetamide, it is most important that a cheap and simple process for the preparation of these materials be available.

The primary object of this invention is to provide such a process. A further object of this invention is to contribute a unique method of synthesis of N,N-dialkyldihydrocarbon-substituted acetamides to acetamide technology. Another object is to provide a process for the preparation of N,N - dialkyldihydrocarbon - substituted acetamides which for the first time employs an organometallic reactant. A still further object is to provide an extremely cheap process for the synthesis of the important herbicidally active agricultural chemical, N,N-dimethyldiphenylacetamide, employing reactants which are simply and cheaply produced from such readily available and inexpensive raw materials as sodium and benzene. These and other objects of this invention will appear more fully hereinafter.

In accordance with this invention hydrocarbon-substituted N,N-dialkylacetamides are produced by reacting a compound of the general formula:

wherein R is hydrogen or a hydrocarbon group, $R^1$ and $R^2$ are aryl, and M is an alkali metal, with a compound of the general formula:

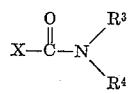

wherein $R^3$ and $R^4$ are alkyl and X is halo, preferably chloro, bromo, or fluoro. The preparation of N,N-di(lower-alkyl)diphenylacetamide by reacting an alkali-metallo-diphenylmethane with an N,N-di(lower-alkyl)-carbamyl chloride is a preferred embodiment of the invention. Representative of the foregoing is the preparation of the important herbicide N,N-dimethyldiphenylacetamide by reacting diphenylsodiomethane with N,N-dimethylcarbamyl chloride. Another embodiment of this invention is a process for the preparation of N,N-dialkyldihydrocarbylacetamides which comprises (1) the preparation of an alkali-metallo-diarylmethane by reacting a compound of the formula:

wherein R is hydrogen or a hydrocarbon group and $R^1$ and $R^2$ are aryl, with a metallating agent capable of substituting an alkali-metal atom for the hydrogen atom directly attached to the methyl carbon of the foregoing compound, and (2) reacting said alkali-metallo-diarylmethane with a compound of the formula:

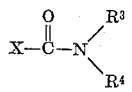

wherein $R^3$ and $R^4$ are alkyl and X is halo. It is preferred that the alkali metallating agent be a sodium metallating agent—sodium amide and sodium metal being especially preferred. It is also preferred to react the sodium metallating agent with diphenylmethane to produce diphenylsodiomethane and thereafter to react this product with N,N-dimethylcarbamyl chloride to produce N,N-dimethyldiphenylacetamide.

The preparation of the foregoing alkali-metallo-diarylmethane forms another embodiment of this invention and is effected by reacting an alkali metallating agent with a diarylmethane having a replaceable hydrogen on the carbon of the methane moiety of the formula:

wherein R is hydrogen or a hydrocarbon group and $R^1$ and $R^2$ are aryl, the reaction being carried out while mixing and grinding the reactants under ball milling conditions. A specific example of this embodiment is a process for producing diphenylsodiomethane which comprises reacting a metallating agent, as defined above, preferably sodium amide or sodium, with diphenylmethane, while mixing and grinding the reactants under ball milling conditions.

The alkali-metallo-diphenylmethane can also be produced by a "direct metallation" reaction, that is, a reaction where an alkali metal, such as sodium, is reacted with diphenylmethane to directly substitute an alkali-metal atom for a hydrogen atom attached to the carbon of the methyl group, i.e.,

The alkali metal can be employed as a dispersion, using a high-speed stirrer and a standard dispersing agent; in molten form, employing temperatures above the melting point of the alkali metal; or in high-surface form, wherein the alkali metal is applied to a finely ground inert carrier, so as to provide greater surface of the alkali metal for reaction. The alkali metal can also be reacted as a solid, and as such it is preferred that the particle size thereof be below about 50 microns.

A highly preferred embodiment of this invention is the preparation of N,N-dimethyldiphenylacetamide using benzene, methylene dichloride, sodium, phosgene, and trimethylamine. This embodiment is preferred because of the extremely favorable economics associated with the utilization of such cheap and readily available raw materials. The process, which has economic advantages representative of those derivable from the instant invention, comprises (1) the preparation of diphenylmethane by reaction of benzene with a methylene halide, such as methylene dichloride, under standard Friedel-Crafts conditions using anhydrous aluminum chloride (e.g., 5 to 10 percent by weight), (2) reacting said diphenylmethane with sodium to produce diphenylsodiomethane, and (3) reacting said diphenylsodiomethane with N,N-dimethylcarbamyl chloride, produced by reacting phosgene and trimethylamine (for example, as set forth in U.S. 2,698,343). From the foregoing it can easily be seen that the instant invention provides a method for the synthesis of hydrocarbon-substituted N,N-dialkylacetamides which is carried out most simply and economically.

Thus, a particular advantage of this invention is that the hydrocarbon-substituted N,N-dialkylacetamides are prepared in an extremely economical manner. Another advantage is that the products obtained are substantially free of undesirable by-products. In this connection, it is important to note that, coproduced as one of the by-products of the process of this invention, is the diarylmethane starting material, e.g., diphenylmethane, which can easily be recovered for recycle.

Further representative of the processes of this invention are the following working examples in which all parts and percentages are by weight.

The following example involves direct metallation of diphenylmethane with sodium.

Example I

Into a reaction vessel provided with means for charging, heating, stirring, and additionally provided with fittings for inlet and outlet of nitrogen is added a solution of 84 parts of diphenylmethane in about 150 parts of toluene. Sodium (12.5 parts) is added, a nitrogen flush is started, and the mixture is stirred under reflux with a high-speed stirrer for 105 minutes. The resulting suspension gradually acquires the yellow-orange color characteristic of diphenylsodiomethane. The suspension is cooled to 30° C. and 27 parts of N,N-dimethylcarbamyl chloride are added dropwise, the temperature rising during the addition to about 70° C. Upon completion of the addition, approximately 30 parts of butanol are added, followed by about 50 parts of ethanol and 300 parts of water. The organic layer is separated, dried over magnesium sulfate, and the solvent removed. The residue is taken up in hot Skellysolve-B and cooled to give significant yields of N,N-dimethyldiphenylacetamide. A good recovery of diphenylmethane is also obtained.

Example II

Diphenylmethane (200 parts), 12 parts of sodium, and 2 parts of dimer acid dispersing agent are added to a reaction vessel provided with means for charging, heating, and stirring, and inlet-outlet fittings for nitrogen. This mixture is heated under nitrogen to 160° C. and stirred with a high-speed stirrer for 45 minutes. The yellow-brown solution which forms during this period is then cooled to room temperature (about 20–25° C.) and a solution of 27 parts of N,N-dimethylcarbamyl chloride is added dropwise. The reaction is worked up as in Example I to give significant yields of N,N-dimethyldiphenylacetamide.

When the above procedure is repeated using diethyleneglycol dimethyl ether at reflux temperature (165° C.), similar results can be obtained.

The following examples are representative of another embodiment of the instant process wherein an alkali metal is reacted with a diarylmethane of the formula:

wherein R, $R^1$, and $R^2$ are as defined herein, in the presence of a metal amide or metal hydride catalyst, such as sodium amide or sodium hydride.

Example III

A solution of 84 parts of diphenylmethane in about 150 parts of toluene is added to a reaction vessel as described in Example I. To this solution are added 12.5 parts of sodium and 2 parts of commercial sodium amide. A nitrogen flush is started and the mixture is stirred under reflux with a high-speed stirrer for 4 hours. The resulting suspension gradually turns yellow-orange. The suspension is then cooled to 30° C. and 27 parts of N,N-dimethylcarbamyl chloride are added dropwise, the temperature rising to about 70° C. Upon completion of the addition, a significant yield of N,N-dimethyldiphenylacetamide is obtained by working the reaction up according to the procedure set forth in Example I.

When Example III is repeated with the exception that 2 parts of sodium hydride are employed in place of 2 parts of sodium amide, N,N-dimethyldiphenylacetamide is similarly obtained.

Example IV is representative of the preparation of a hydrocarbon-substituted N,N-dialkylacetamide by the reaction of an alkali metal amide metallating agent with a diarylmethane, followed by the conversion of the resulting alkali-metallo intermediate to the desired product by reaction with an N,N-dialkylcarbamyl halide.

Example IV

To a reaction vessel, as described in Example I and additionally provided with means for removing off gases, is added a solution of 0.2 mole of potassium amide in about 300 parts of liquid ammonia. Thereafter is added 0.2 mole of diphenylmethane in ether. Ammonia and ether are volatilized by gentle warming, the heating being continued until approximately 500 parts of ether have been removed, additional quantities of ether being added to the reaction vessel as necessary. A solution of 0.2 mole of dimethylcarbamyl chloride in ether is then added dropwise. The reaction mixture is stirred for about a half-hour and the resulting ether suspension is then washed with water, dried over magnesium sulfate, and filtered. The ether is thereafter evaporated on a steam bath. The resulting residue is taken up in hot Skellysolve-B, which gives a good yield of N,N-dimethyldiphenylacetamide on cooling. Removal of the solvent from the filtrate and distillation of the residue gives a good recovery of diphenylmethane.

When the procedure of Example IV is repeated using benzene to replace the ether prior to the addition of the dimethylcarbamyl chloride, yields of N,N-diphenylacetamide and recovery of diphenylmethane are almost identical.

Example V illustrates the preparation of N,N-dimethyldiphenylacetamide from an organosodium metallating agent, diphenylmethane and an N,N-dimethylcarbamyl halide.

Example V

To a reaction vessel provided with means for heating, cooling, refluxing, and high-speed stirring, and containing a suspension of phenyl sodium (prepared from 1 mole of sodium and one-half mole chlorobenzene) in toluene are added 84 parts of diphenylmethane. The resulting mixture is heated to reflux temperature for one-half hour and then cooled to −40° C. A solution of 54 parts of dimethylcarbamyl chloride in toluene is added dropwise with vigorous stirring, the reaction temperature being maintained below −30° C. Thereafter, about 24 parts of butanol are added carefully, followed by 40 parts of ethanol and 300 parts of water. The organic layer is separated from the resulting mixture and dried over magnesium sulfate, thence filtered, and finally the solvent is removed. The resulting residue is taken up in hot Skellysolve-B and then cooled to give 31.5 parts of N,N-dimethyldiphenylacetamide. From the filtrate is recovered 27.9 parts of diphenylmethane.

Starting materials other than those taught in the above examples can be employed to prodce hydrocarbon-substituted N,N-dialkylacetamides in substantially similar manner. These starting materials have been briefly discussed above. One such starting material is a diarylmetallomethane (wherein the metallo group is an alkali metal) having the following general formula:

In this formula R can be hydrogen or a hydrocarbon group. In general, when R is a hydrocarbon, it is preferred that it contain no more than 20 carbon atoms and, preferably, between about 1 and 10 carbons. $R^1$ and $R^2$ are aryl and preferably each contains no more than 14 carbon atoms, optionally, 6 to 10 carbon atoms, as, for example, do phenyl, tolyl, p-ethylphenyl, and p-butylphenyl. Although M can be any alkali metal, such as lithium, potassium, rubidium, cesium, and francium, it is preferred, for economic reasons, that M be sodium. Representative of the hydrocarbon group R are univalent, aliphatic radicals, which can be further substituted, such as the alkyl radicals, methyl, ethyl, isopropyl, n-butyl, isobutyl, tertiary butyl, n-amyl, and various positional isomers, such as, for example 2-methylbutyl, 1,2-dimethylpropyl, and 1-ethylpropyl, and, likewise, the corresponding straight or branched-chain isomers of hexyl, heptyl, octyl, and the like, up to and including about eicosyl. Moreover, such monovalent aliphatic radicals can be alkenyl, such as, for example, ethenyl, $\Delta^1$-propenyl, isopropenyl, $\Delta^2$-butenyl, $\Delta^3$-butenyl, and the corresponding branched-chain isomers thereof, and other alkenyl radicals, such as hexenyl, heptenyl, octenyl, up to and including eicosenyl, and their corresponding branched-chain isomers. Furthermore, the hydrocarbon, R, can be a univalent alicyclic radical which can be further substituted. The monovalent hydrocarbon substituent, R, can be aralkyl radicals, such as, for example, benzyl, α-phenylethyl, β-phenylpropyl, γ-phenylpropyl, β-phenylisopropyl, α-phenylbutyl, γ-phenylbutyl, and the like, and α'-naphthylmethyl, α-(α'-naphthyl)ethyl, α-(β'-naphthyl)ethyl, and the like, and their corresponding positional isomers. Moreover, the univalent aliphatic radical or radicals can be aralkenyl radicals, such as, for example, α-phenyl ethenyl, α-phenyl-$\Delta^1$-propenyl, β-phenyl-$\Delta^1$-propenyl, α-phenyl-$\Delta^2$-propenyl, α-phenylisopropenyl, β-phenylisopropenyl, and, similarly, the phenyl derivatives of the isomers of butenyl, pentenyl, and the like. Other such aralkenyls include α-(α'-naphthyl)ethenyl, β-(α'-naphthyl)ethenyl, α - (β'-naphthyl) - $\Delta^1$-propenyl, β-(β'-naphthyl) - $\Delta^1$ - propenyl, α - (β' - naphthyl)-$\Delta^2$-propenyl, α-(α'-naphthyl)isopropenyl, and the like.

When the monovalent hydrocarbon radical is a univalent alicyclic radical or radicals, these can be selected from the group consisting of cycloalkyl and cycloalkenyl radicals. Thus, for example, they can be the cycloalkyl radicals, including cyclopropyl, cyclobutyl, cycloamyl, cyclohexyl, and the like, and such cycloaliphatic radicals as α-cyclopropylethyl, β-cyclobutylpropyl, and the like. Similarly, the alicyclic radicals can be cycloalkenyl radicals, such as, for example, α-cyclohexylethenyl, α-cycloheptyl - $\Delta^1$ - propenyl, β-cyclooctyl-$\Delta^2$-propenyl, β-cyclononylisopropenyl, and the like. It is to be understood that the foregoing radicals are merely exemplary and other examples will be evident to those skilled in the art. Furthermore, these radicals may have other substituents, provided such substituents are inert to the reactants. Exemplarly of such inert substituents are alkoxy, alkylmercapto, dialkylamino, acetal, and the like, as well as hydrocarbon groups, such as those defined hereinabove.

Another starting material of this invention is an N,N-dialkylcarbamyl halide, having the following general formula:

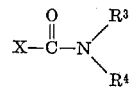

wherein $R^3$ and $R^4$ are alkyl, as defined hereinbefore, and X is halo. In general it is preferred that $R^3$ and $R^4$ be lower alkyl groups, which can be the same or different.

The diarylmetallomethane metallating agent utilized as a reactant in this invention can be prepared by a variety of methods, such as "direct metallation" with an alkali metal, metallating with an alkali metal in the presence of catalyst, and the utilization of alkali metal-containing metallating agents, such as alkali metal amides, and organoalkali metal compounds. These metallating agents can be reacted with compounds having the general formula:

wherein R, $R^1$, and $R^2$ are as defined hereinbefore. In certain embodiments of this invention these last-mentioned compounds and a metallating agent constitute starting materials utilized in this invention.

In general any alkali metal, alkali metal-containing compound, such as potassium amide, or organometallic alkali metal compound, such as phenyl sodium, can be employed as a metallating agent in the process of this invention. Usually, however, it is preferred that the metallating agent be an alkali metal, an alkali metal amide or alkali metal hydride, since the use thereof results in processing economies. It is particularly preferred that the alkali metal or the alkali metal portion of the foregoing amide or hydride be sodium.

The term "alkali metal amide," as employed herein, includes both true amides, such as sodium amide ($NaNH_2$), and lower-alkyl alkali metal amides, such as dimethyl sodium amide. Representative of the alkali metal amides which can be employed as metallating agents in this invention are sodium amide, potassium amide, lithium amide, diethyl sodium amide, dimethyl lithium amide, diethyl potassium amide, dipropyl sodium amide, dibutyl sodium amide, and the like. Exemplary of the alkali metal hydrides employed herein are lithium hydride, sodium hydride, potassium hydride, rubidium hydride, cesium hydride, and the like, although the latter two are seldom employed because of the unfavorable economics involved in the utilization thereof. Representative of other metallating agents which can be employed in this invention are organoalkali metal compounds, wherein the organo group is a hydrocarbon radical as defined hereinabove, such as phenyl sodium, amyl sodium, butyl sodium, propyl lithium, naphthyl sodium, naphthyl potassium, and the like.

In addition to the preparation of the diarylmetallomethane reactant of this invention by "direct metallation" with an alkali metal, a catalytic metallation similar to that utilized in Example III can be employed. This type of metallation reaction involves reacting an alkali metal with a diarylmethane as defined herein, in the presence of catalytic amounts of an alkali metal amide or alkali metal hydride. By "catalytic amounts" is meant generally up to about 5 percent of the weight of the diarylmethane employed in the reaction system.

Thus it can be seen that a wide range of starting materials can be employed in the process of this invention to produce a wide variety of hydrocarbon-substituted N,N-dialkylacetamides. For example, employing the procedure of Example I, when two equivalents of diphenylmethane are reacted with two equivalents of potassium, and the diphenylpotassiomethane produced thereby is then reacted with one equivalent of diethylcarbamyl chloride, there is produced N,N-diethyldiphenylacetamide. N,N-dipropyldi-p-tolylacetamide is produced according to the process of Example II by the reaction of two equivalents of di(p-tolyl)sodiomethane (prepared by reacting dispersed lithium with di(p-tolyl)methane) with one equivalent of dipropylcarbamyl bromide. Similarly, the reaction of sodium amide with diphenylmethane to produce diphenylsodiomethane, and the subsequent reaction of approximately two equivalents of this product with dimethylcarbamyl chloride, using temperatures ranging from about 140–210° C. for the metallation step and up to about 100° C. for reaction with the halide produces N,N-dimethyldiphenylacetamide. The reaction of phenylnaphthylsodiomethane with dibutylcarbamyl bromide produces N,N - dibutylphenylnaphthylacetamide. When approximately two equivalents of decyldiphenyllithiomethane are reacted with about one equivalent of dipropylcarbamyl fluoride, there is produced N,N-dipropyldecyldiphenylacetamide. The reaction of methyldinaphthylpotassiomethane with dimethylcarbamyl chloride produces N,N-dimethyl methyldinaphthylacetamide.

The temperatures at which the subject reactions are conducted do not appear to be critical. Naturally, it is necessary to employ a temperature sufficient to initiate the reaction and below the decomposition temperature of the lowest decomposing reactant or product. In general, overall reaction temperatures ranging from about −75° C. to about 300° C. can be employed so long as the afore-mentioned conditions are observed. In carrying out the metallation step, reaction temperatures ranging from about 25° C. to about 200° C. are preferably employed, and the reaction of the diarylcarbamyl halide with the metallating agent is preferably carried out at a reaction temperature ranging from about 0° C. to about 150° C. The higher the temperature, of course, the faster the reaction.

Preferably the proportions of reactants employed in the process of this invention are stoichiometric quantities. By "stoichiometric quantities" is meant, for example, the utilization of two moles of the diarylmethane reactant, two moles of the metallating agent, and one mole of the N,N-dialkylcarbamyl halide to yield one mole of the acetamide product. Although the foregoing proportions are preferred, the acetamide product can be obtained employing relatively broad ranges of reactant proportions. For example, an excess of any reactant can be used (generally no more than two-fold), or equimolar quantities can be employed. However, if optimum yield and product purity are to be achieved, it is desirable to utilize proportions which approximate the aforementioned stoichiometric quantities in order that the reaction may be carried out in the most economical manner.

The reaction can be conducted at atmospheric or subatmospheric pressures. Subatmospheric pressures have the advantage of enhancing removal of any volatile by-products that may be present, thus promoting a more rapid reaction and more complete shifting of the equilibrium.

It is preferred that the reaction be conducted in an inert atmosphere, such as argon, nitrogen, krypton, or the like. For some purposes it is desirable to conduct the reaction under an inert liquid blanket. One of the purposes of such a technique is to avoid contamination by impurities in the flushing gas. Another reason is that this inert blanket acts as a solvent for hydrogen or ammonia gas—a particular advantage when it is desired to generate the hydride or amide catalysts of the catalytic embodiment of this invention in situ. The inert liquid blanket employed can be a high-boiling hydrocarbon oil, such as mineral oil, or a lower boiling diluent, such as toluene and those set forth below.

Diluents can be employed in the process of this invention and in general can be any liquid which, under reaction conditions, is inert to the reactants and products produced. Representative of such diluents are the well-known hydrocarbon solvents, such as benzene, toluene, xylene, n-nonane, n-pentane, decalin, tetralin, mineral oil, and the like; other organic solvents, such as furan, diethyl ether tetrahydrofuran, diisopropyl ether, dioxane, cyclohexene, cyclohexane, and furfural; and liquid ammonia and the like inert diluents having boiling points ranging from about −75° to about 300° C.

The process of this invention can be adapted to either continuous or batch methods. Batch operation, however, appears to be preferable, particularly when a reactor of a ball mill type is employed. Such a mill is a cylindrical or a conical shell rotating on a horizontal axis and charged with a grinding medium, such as balls of steel. Although the ball mill is preferred, other tumbling mills, such as pebble, rod, tube, and compartment mills also can be employed. The ball mill is preferred because of the excellent results achieved therewith, and its simplicity of operation and versatility in use. The ball mill comprising a steel lined cylindrical steel shell containing a charge of steel balls is rotated horizontally about its axis so that size reduction is obtained by the tumbling of the balls on the reactant material in contact therebetween—this in the case of solid reactants. In cases where one or both of the reactants are liquid, the ball mill effects an extremely intimate contact between the reactants—this latter action not necessarily being a grinding action but more on the order of an intimate mixing operation. The ball mill may be operated either wet or dry, and may be utilized in a batch, open circuit, or closed circuit operation.

In carrying out the "direct metallation" embodiment of this invention, e.g., reacting diphenylmethane with sodium metal, the particle size of the reactants is extremely important. In general it is preferred to employ particle sizes below about 50 microns. This particle size reduction can be achieved in several ways, such as through the utilization of standard dispersing agents, as, for example, dimeric acids, and other nonionic dispersing agents. In general these dispersions comprise about 1 to 2 percent by weight of a dispersing agent, 20 to 50 percent of an alkali metal, and the remainder inert diluent. It is preferred, however, to obtain the desirable particle size through the utilization of a ball mill reactor since excellent results are achieved therewith.

I claim:

1. The process which comprises comminuting an alkali metal with a diphenylmethane in a tumbling mill at a temperature below about 200° C. for a time sufficient to effect reaction thereof, said diphenylmethane having at least one replaceable hydrogen atom attached to the methane carbon atom, whereby the corresponding alkalimetallo-diphenylmethane is obtained, and commingling said alkali-metallo-diphenylmethane with an N,N-di(lower-alkyl)carbamyl halide, whereby said substances are caused to react and whereby the corresponding N,N-di-(lower-alkyl)diphenylacetamide is obtained.

2. The process which comprises comminuting metallic sodium with a diphenylmethane in approximately equimolar ratio in an inert atmosphere in a ball mill at a temperature between about 140 and about 210° C. for a time sufficient to effect reaction thereof, said diphenylmethane having at least one replaceable hydrogen atom attached to the methane carbon atom, whereby the corresponding diphenylsodiomethane is obtained, and commingling said diphenylsodiomethane with an N,N-di(lower-alkyl)carbamyl chloride, whereby said substances are caused to react and whereby the corresponding N,N-di-(lower-alkyl)diphenylacetamide is obtained.

3. The process which comprises mixing and grinding metallic sodium with diphenylmethane in approximately equimolar ratio in an inert atmosphere in a ball mill at a temperature between about 140 and about 210° C. for a time sufficient to effect reaction thereof, whereby diphenylsodiomethane is obtained, and commingling said diphenylsodiomethane with N,N-dimethylcarbamyl chloride, whereby said substances are caused to react and whereby N,N-dimethyldiphenylacetamide is obtained.

4. A process for producing an alkali-metallo-diphenylmethane from a diphenylmethane having at least one replaceable hydrogen atom attached to the methane carbon atom, which comprises comminuting an alkali metal with said diphenylmethane in an inert atmosphere in a tumbling mill at a temperature below about 200° C. for a time sufficient to effect reaction thereof.

5. A process for producing a diphenylsodiomethane from a diphenylmethane having at least one replaceable hydrogen atom attached to the methane carbon atom, which comprises comminuting metallic sodium with said diphenylmethane in an inert atmosphere in a ball mill at a temperature between about 140 and about 210° C. for a time sufficient to effect reaction thereof.

6. A process for producing diphenylsodiomethane which comprises mixing and grinding metallic sodium with diphenylmethane in approximately equimolar ratio in an inert atmosphere in a ball mill at a temperature between about 140 and about 210° C. for a time sufficient to effect reaction thereof.

7. The process which comprises commingling an alkali-metallo-diphenylmethane with an N,N-di(lower-alkyl)-carbamyl halide, whereby said substances are caused to react, and whereby the corresponding N,N-di-loweralkyl)diphenylacetamide is obtained.

8. The process which comprises commingling a diphenylsodiomethane with an N,N-di(lower-alkyl)carbamyl chloride, whereby said substances are caused to react, and whereby the corresponding N,N-di-loweralkyl)diphenylacetamide is obtained.

9. The process which comprises commingling diphenylsodiomethane with N,N-dimethylcarbamyl chloride, whereby said substances are caused to react, and whereby N,N-dimethyldiphenylacetamide is obtained.

References Cited in the file of this patent

Yost et al.: Jour. Am. Chem. Soc., vol. 69, pp. 2325–8 (1947).

Hauser et al.: Jour. Org. Chem., volume 23, pp. 916–918 (1958).

Hambrick et al.: Jour. Am. Chem. Soc., vol. 81, pp. 2096–9 (1959).